US012716265B2

(12) United States Patent
Wong

(10) Patent No.: US 12,716,265 B2
(45) Date of Patent: Aug. 25, 2026

(54) DEADBOLT

(71) Applicant: ASSA ABLOY Residential Group, Inc., New Haven, CT (US)

(72) Inventor: Wai P. Wong, Orange, CT (US)

(73) Assignee: MASTER LOCK COMPANY LLC, Oak Creek, WI (US)

( * ) Notice: Subject to any disclaimer, the term of this patent is extended or adjusted under 35 U.S.C. 154(b) by 178 days.

(21) Appl. No.: 18/326,388

(22) Filed: May 31, 2023

(65) Prior Publication Data

US 2024/0068271 A1 Feb. 29, 2024

Related U.S. Application Data

(60) Provisional application No. 63/401,794, filed on Aug. 29, 2022.

(51) Int. Cl.

| | |
|---|---|
| ***E05B 9/08*** | (2006.01) |
| ***E05B 9/02*** | (2006.01) |
| ***E05B 15/16*** | (2006.01) |
| ***E05B 17/20*** | (2006.01) |
| ***E05B 47/00*** | (2006.01) |

(52) U.S. Cl.

CPC ................ *E05B 9/084* (2013.01); *E05B 9/02* (2013.01); *E05B 15/1614* (2013.01); *E05B 17/2084* (2013.01); *E05B 47/0012* (2013.01); *E05B 2017/2096* (2013.01); *E05B 2047/0017* (2013.01); *E05B 2047/002* (2013.01); *E05B 2047/0084* (2013.01)

(58) Field of Classification Search

CPC ...... E05B 17/20; E05B 17/2084; E05B 49/00; E05B 63/08; E05B 65/00; E05B 9/00; E05B 9/084; E05B 9/02; E05B 15/1614; E05B 47/0012; E05B 2017/2096; E05B 2047/002; E05B 2047/0084; Y10T 70/7915; Y10T 70/8459; Y10T 70/8541

USPC ........................................................... 70/129

See application file for complete search history.

(56) References Cited

U.S. PATENT DOCUMENTS 2,739,472 A * 3/1956 North .................... E05B 55/005 292/169.23
2,829,913 A * 4/1958 North .................... E05B 55/005 235/60 MT
10,683,677 B1 * 6/2020 Funamura ............ E05B 17/226
(Continued)

OTHER PUBLICATIONS

Ultraloq U-Bolt Pro Installation and User Guide, 2020, 40 pgs.
(Continued)

*Primary Examiner* — Suzanne L Barrett
(74) *Attorney, Agent, or Firm* — Calfee, Halter & Griswold LLP

(57) ABSTRACT

A deadbolt lock assembly is disclosed. The deadbolt lock assembly includes an exterior lock mechanism and an interior lock mechanism mechanically connected through a bored hole in a door. The exterior portion of the lock assembly includes a reinforced chassis with a reinforced lock cylinder bore and an anti-rotation arm to enhance the lock's resistance to attack. The interior portion includes a thumbturn that is physically connected to the gearbox frame for robustness and includes stabilizing detents to improve the user feel. The gearbox frame and mounting bracket are connected with a single screw and spring-loaded latch for ease of assembly.

23 Claims, 11 Drawing Sheets

(56) References Cited

U.S. PATENT DOCUMENTS

| | | | | | |
|---|---|---|---|---|---|
| 2006/0065025 | A1 * | 3/2006 | Viviano | E05B 63/04 | 70/134 |
| 2006/0114099 | A1 * | 6/2006 | Deng | G07C 9/00563 | 70/277 |
| 2009/0133454 | A1 * | 5/2009 | Frolov | E05C 1/02 | 70/279.1 |
| 2010/0257906 | A1 * | 10/2010 | Sorensen | E05B 47/068 | 70/91 |
| 2015/0007621 | A1 * | 1/2015 | Huang | E05B 63/0017 | 70/129 |
| 2016/0040454 | A1 * | 2/2016 | Viviano | E05B 13/005 | 70/129 |
| 2018/0080253 | A1 * | 3/2018 | Martin | E05B 15/0205 | |

OTHER PUBLICATIONS

Schlage Touch Keyless Touchscreen Lock, 13, pp. 2019.
Smonet Smart Lock Manual, 27 pgs., the reference illustrates a lock assembly believed to be in public use prior to Aug. 29, 2022.

* cited by examiner

DEADBOLT

CROSS-REFERENCE TO RELATED APPLICATIONS

This application claims the benefit under 35. U.S.C. § 119(e) to U.S. Provisional Application Ser. No. 63/401,794, titled "DEADBOLT," filed Aug. 29, 2022, which is herein incorporated by reference in its entirety.

BACKGROUND

Deadbolt locks are one type of lock used to secure doors against entry by unauthorized individuals. The deadbolt lock assembly controls the motion of the deadbolt assembly, allowing the bolt to retract only after a user has provided proper credentials and activated the lock.

BRIEF SUMMARY

According to one aspect, a lock assembly is provided. The lock assembly includes an exterior portion configured to be mounted on an outside of a door and an interior portion configured to be mounted on an inside of the door. The exterior portion and the interior portion are configured to be fastened to each other. A deadbolt assembly is configured to be actuated by the exterior and interior portions. The exterior portion includes a chassis and an anti-rotation arm disposed on the chassis. The anti-rotation arm is configured to abut the deadbolt assembly and configured to transfer torque from the chassis to the deadbolt assembly, thereby inhibiting compromising integrity of the lock assembly.

According to one aspect an electronic lock assembly is provided. The lock assembly includes an exterior portion configured to be mounted on an outside of a door and an interior portion configured to be mounted on an inside of the door. The exterior portion and the interior portion are configured to be fastened to each other. A deadbolt assembly is configured to be actuated by either of the exterior and interior portions. The exterior portion includes an interface for inputting a user credential. The interior portion includes a motor and gearbox configured to actuate the deadbolt, a mounting bracket configured to connect to exterior portion, and a gearbox frame housing the motor and gearbox. The gearbox frame is connected to the mounting bracket with a single screw and a hook and latch arrangement.

According to one aspect a lock assembly is provided. The lock assembly includes an interior portion configured to be mounted on an inside of a door. The interior portion is configured to cooperate with an exterior portion configured to be mounted on an outside of a door. The interior portion is further configured to enable actuation of a deadbolt assembly. The interior portion includes a thumbturn configured to actuate the deadbolt assembly and a plurality of stabilizing detents disposed on the interior portion. The distal ends of the stabilizing detents are configured to engage the thumbturn so as to reduce wobble.

According to one aspect a lock assembly is provided. The lock assembly, includes an exterior portion configured to be mounted on an outside of a door. The exterior portion includes a chassis having a key cylinder bore, and a key cylinder. The key cylinder has a key cylinder body and a substantially rectangular lock pin cover that is disposed along a top of the key cylinder body. The key cylinder is disposed within the key cylinder bore in the chassis. The chassis is configured to retain the key cylinder within the key cylinder bore so as to limit removal of the key cylinder in an exterior-facing direction from the chassis.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various nonlimiting embodiments when considered in conjunction with the accompanying figures.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein. In the drawings.

DETAILED DESCRIPTION

Figure 1A:
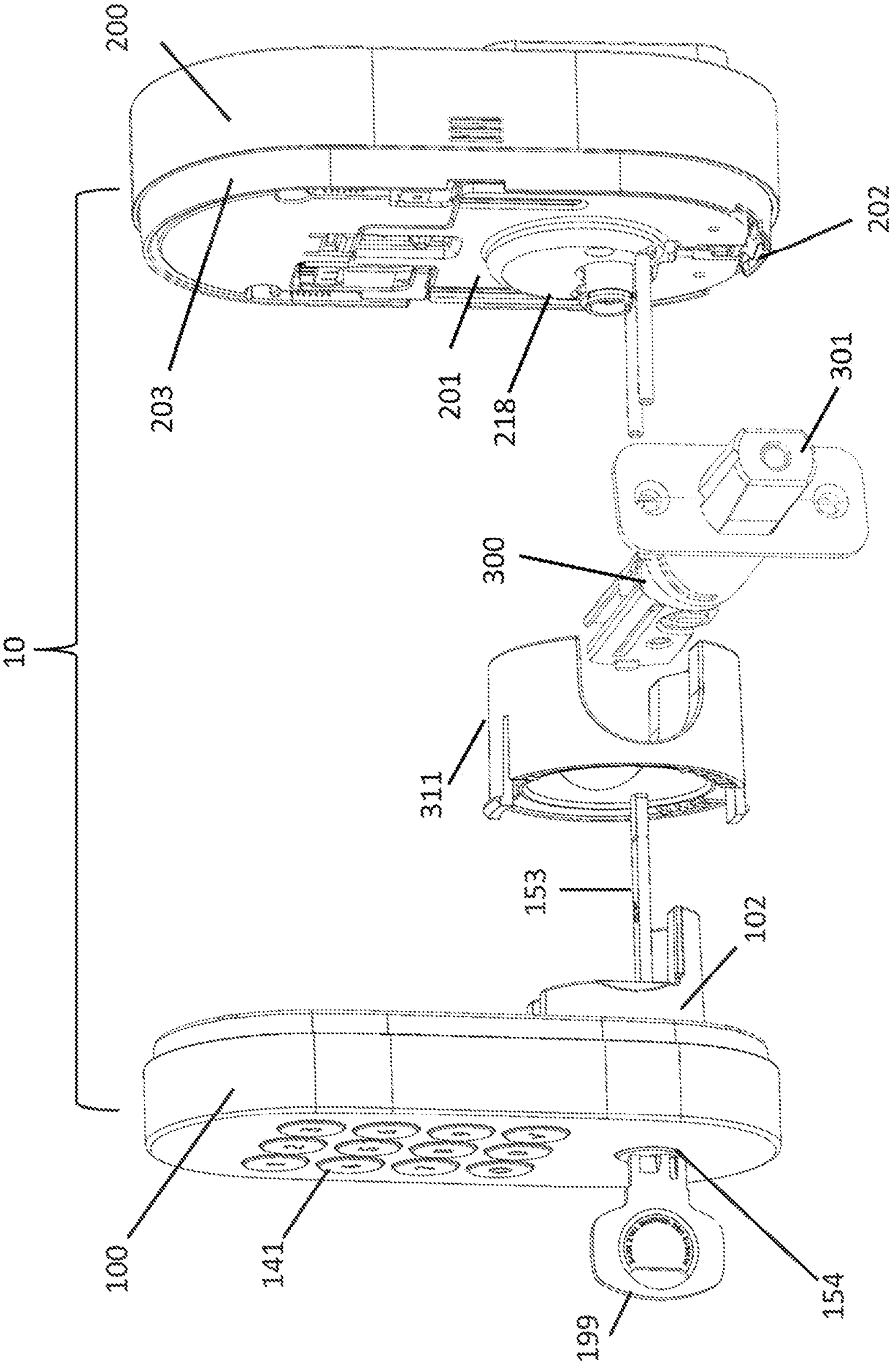
FIG. 1*a* is an exploded view of a deadbolt lock assembly including the exterior and interior portions of the lock assembly.

As lock mechanisms are responsible for protecting spaces from unauthorized entry by would-be intruders, they often face assault by those individuals in an attempt to defeat the lock and thereby gain entry to the locked space. The Inventors have recognized certain improvements to such locks to increase their resistance to such attacks. Additionally, the Inventors have created improvements that provide additional robustness, enhance security, ease of installation, use and/or manufacturability.

Aspects described herein relate to improvements in deadbolt lock assemblies (also referred to as locks) as applied to door locks. Door lock assemblies typically include and exterior portion accessible to persons both authorized and unauthorized to enter the locked space; an interior portion accessible only to users within the locked space; and a deadbolt assembly mortised into the door. Within the deadbolt, a sliding member (the bolt) can traverse within the door and extend therefrom so that it may partially enter the door jamb to prevent the door from opening. The exterior portion of the lock assembly may contain key openings, touchpads, and/or other interface for a user to present a key, passcode, or any other credential to unlock the lock. The interior portion of the lock assembly resides within the locked space when the door is closed and therefore the interior portion may include a thumbturn to allow a user to lock and unlock the deadbolt lock assembly without having to present a key or other credential. Although a thumbturn included in the illustrated embodiment, other embodiments are contemplated including embodiments where a key, slide, or button may be used. Also, the lock may be manually locked/unlocked (as with turning keys, knobs, or thumbturns) or electrically locked/unlocked with a motor or solenoid that moves in response to an electrical input. In some embodiments a deadbolt lock may allow for a user to lock/unlock either electrically or mechanically.

The Inventors have recognized solutions to observed lock vulnerabilities. Embodiments disclosed herein relate to creating a more robust and tamper-proof lock. For example, in one embodiment, the lock assembly incorporates an anti-rotation arm on the exterior lock chassis to enhance the ability of the lock to resist attack, such as by striking downward or twisting the exterior portion of the lock. Also, in prior locks, the key cylinder on the exterior of the lock can be compromised by attackers attempting to extract the key cylinder from the outside of the lock. Chassis improvements described herein impede such attacks by securing the key cylinder into the chassis to inhibit removal of the key cylinder from the exterior of the lock.

The Inventors have also recognized that users may employ the thumbturn as a handle to open or close the door which can lead to looseness of the thumbturn or failure of the components to which it is mounted. A solution is described herein where the thumbturn is held into a frame by a spring clip such that tensile forces or vertical forces on the thumbturn shaft will be carried by the frame. These features reduce the likelihood of thumbturn failure, such as the thumbturn breaking lose from the lock assembly due to rough handling by a user or other extreme conditions. Detents acting on the exterior facing side of the thumbturn apply a tensile preload to the thumbturn to remove excess play (e.g., “wobble”) and improve the user “feel” of the lock.

The frame in which the thumbturn is held may also act as the frame that encloses the electric lock motor. The Inventors have found that for ease of manufacturing, this motor frame can be attached to an interior mounting bracket by a hook and latch. In one embodiment, the motor frame is fixed to the interior mounting bracket with only a single screw to easily install or remove the motor and motor frame.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1B:
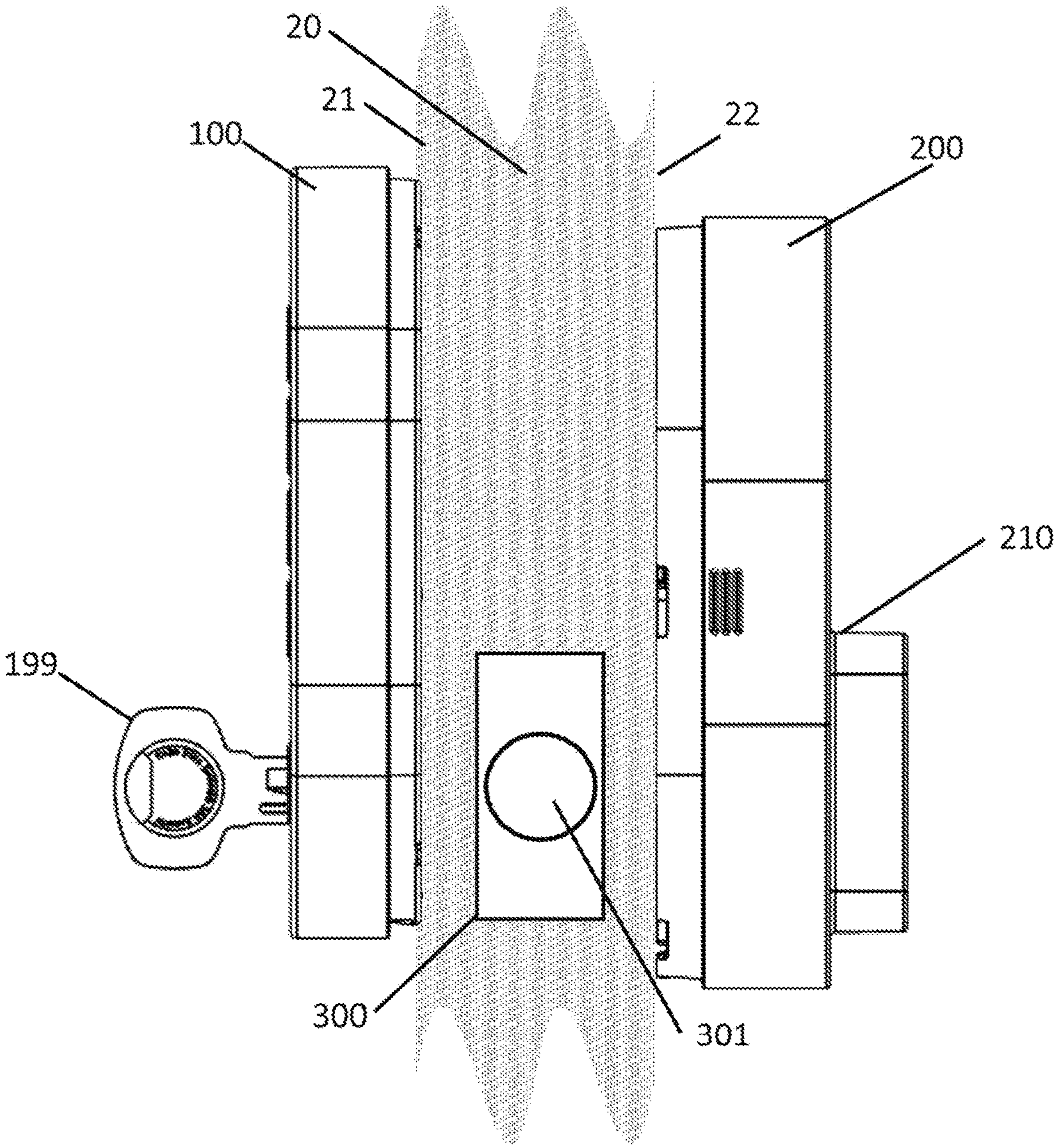
FIG. 1B is a side view of the deadbolt lock assembly mounted on a door.

FIGS. 1*a* and 1*b* illustrate one embodiment of a deadbolt lock assembly 10. An exterior portion 100 of the assembly 10 mounts to an outside 21 of a door 20 facing into the unsecured space and an interior portion 200 mounts to an inside 22 of the door 20 facing into the secured space. In one embodiment, the lock assembly can be a configured as a motor-driven lock where the deadbolt may be motor driven. Of course the disclosure is not so limited, as the lock assembly can be manually drive. A physical key 199 may be inserted into a key override cylinder 154 (see also FIG. 2) that allows a user to lock or unlock the lock without entering a code or in the case of a loss of battery power or other malfunction.

Figure 2:
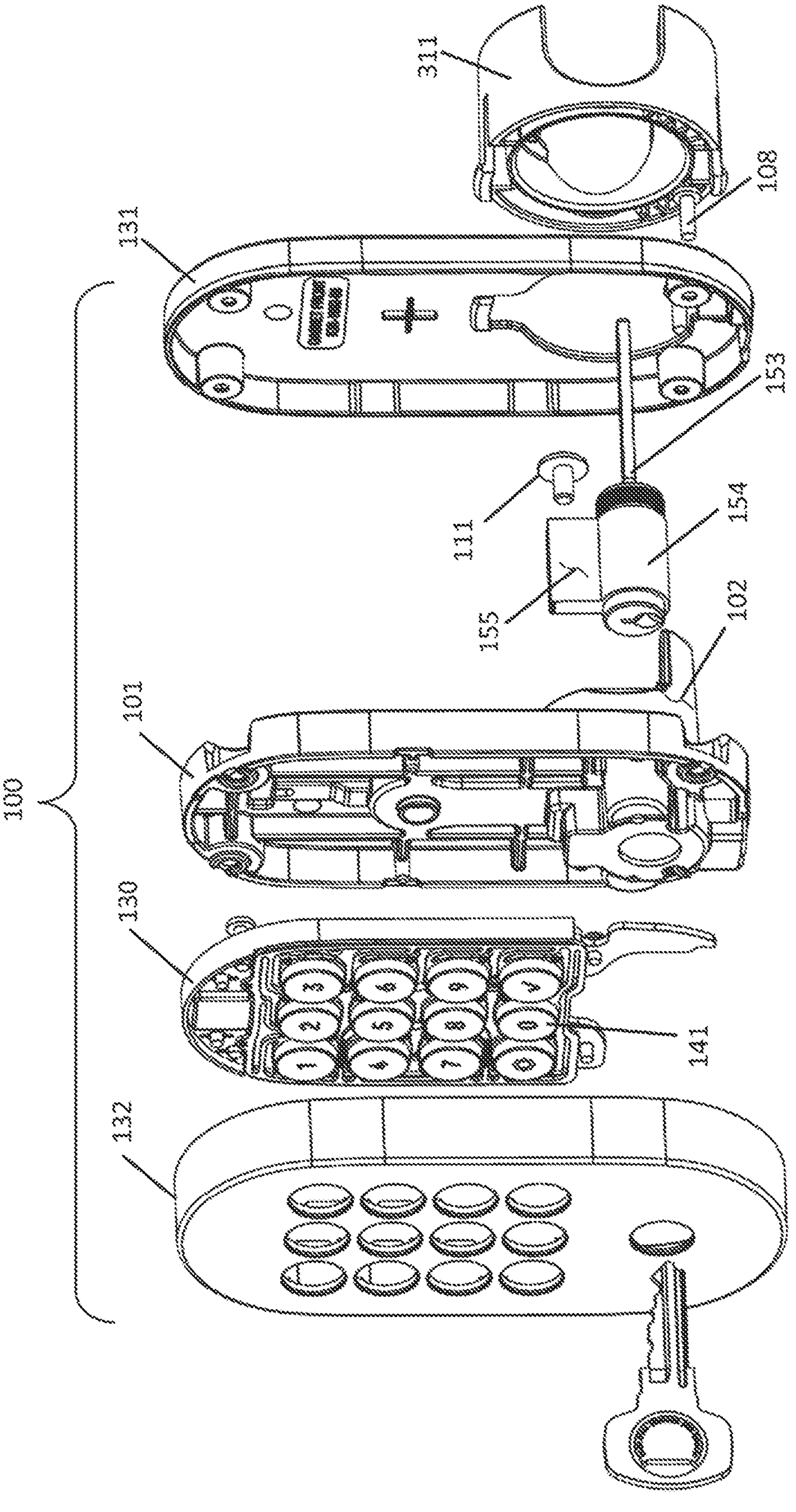
FIG. 2 is an exploded view of the exterior portion of the lock assembly of FIG. 1*a;*

A keypad 141, as shown in FIGS. 1*a* and 2, allows a user to enter a code to lock or unlock the lock assembly. The key cylinder 154 that received the key 199 is located below the keypad, though other suitable locations are contemplated as the present disclosure is not limited in this regard. The keypad and key cylinder provide a user interface in the illustrated embodiment but other interfaces where a user may present credentials are contemplated.

As mentioned, the interior portion of the lock, 200, is mounted on the inside 22 of the door 20 facing into the locked space. As the user would already be in the locked space, the user may control the lock with a thumbturn to retract the deadbolt, allowing the door to be opened.

Figure 3A:
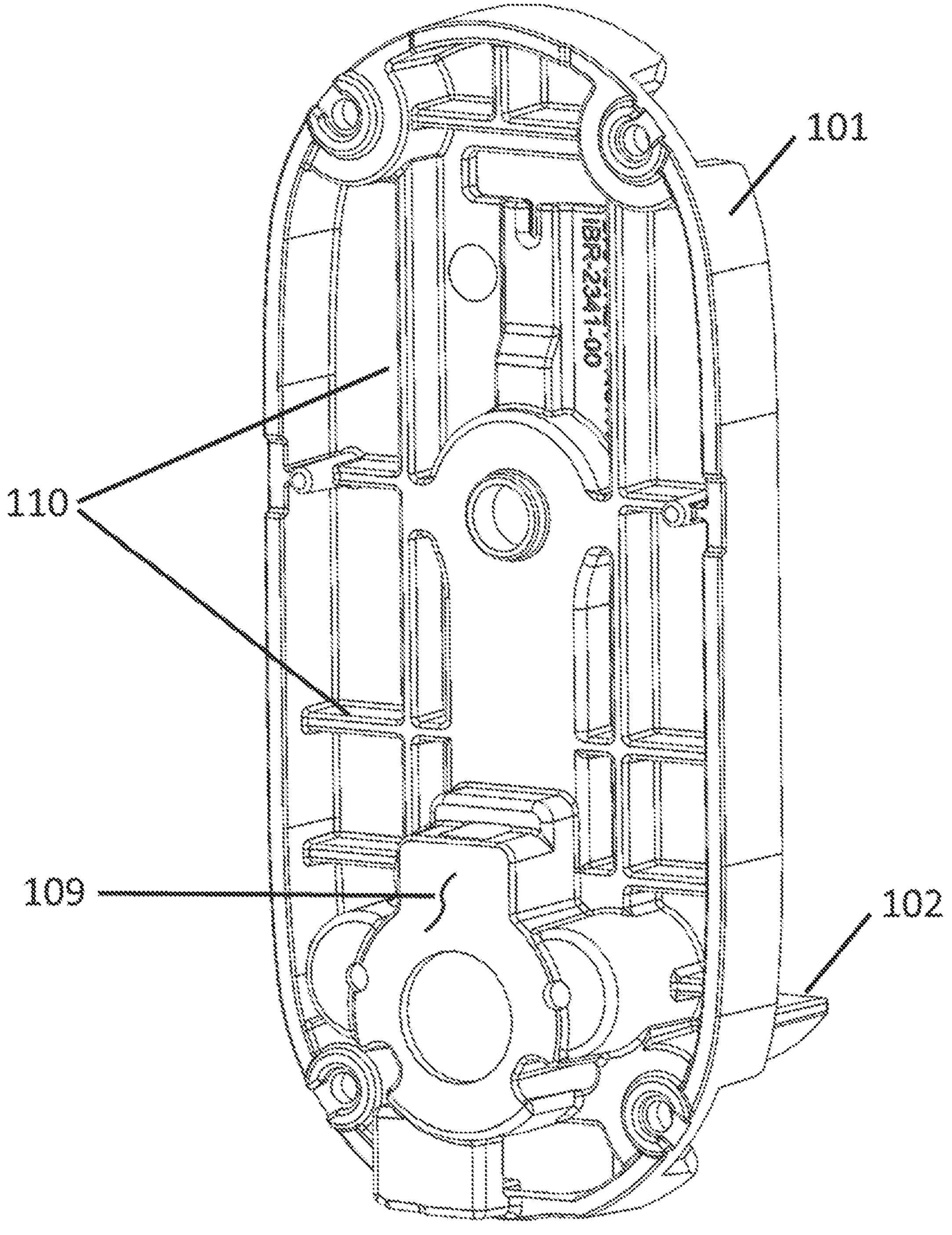
FIG. 3*a* is an exterior facing perspective view of a lock chassis of FIG. 2.
Figure 3B:
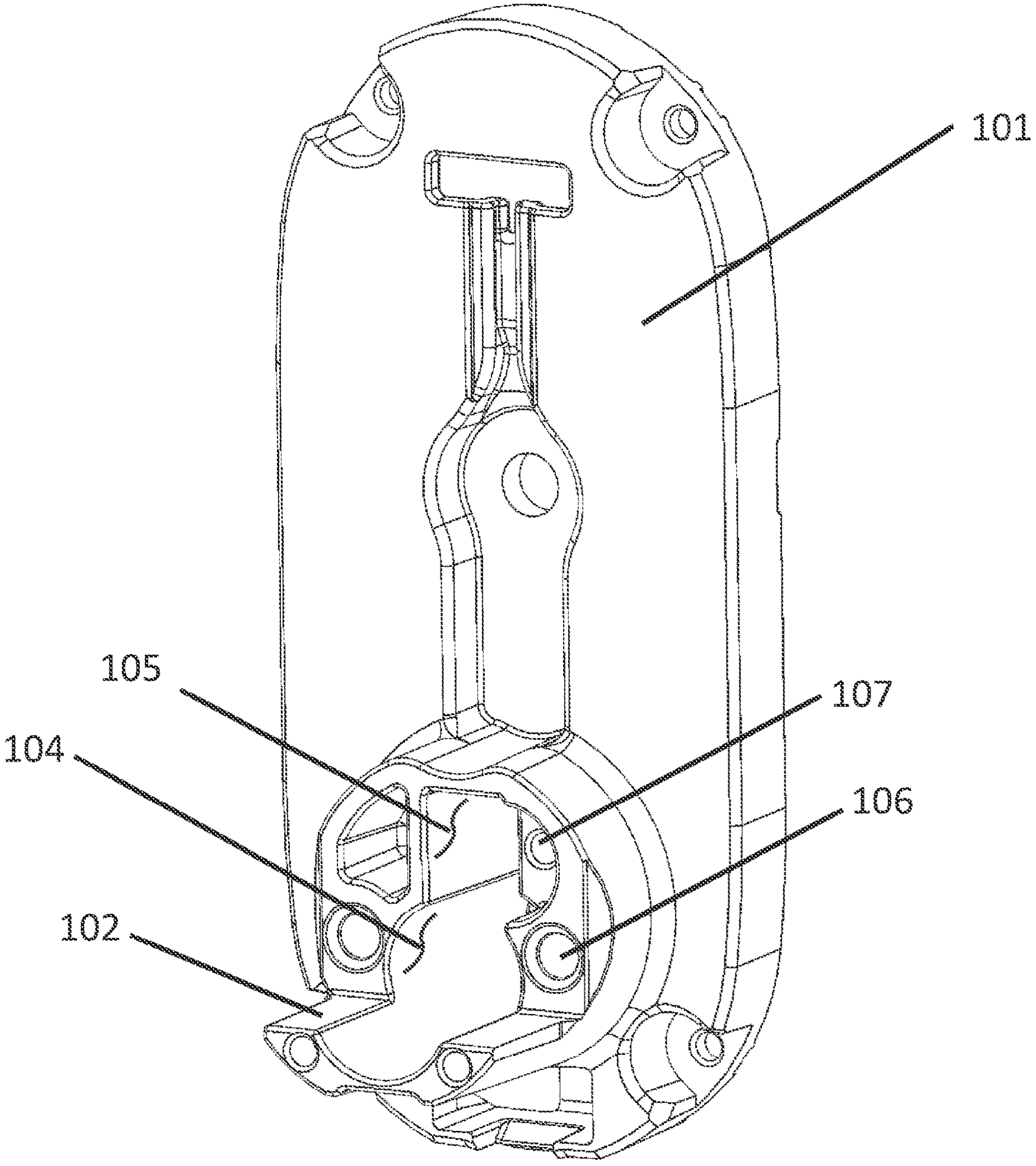
FIG. 3*b* is an interior facing perspective view of the lock chassis of FIG. 2.

The lock is secured to the door with mounting bracket 201 and mounting bolts (not shown) which pass through the mounting bracket, through the bore of the door, running through holes in the deadbolt assembly 300 and fastening into blind threaded holes 106 in the chassis 101 (see FIGS. 2, 3*a*, 3*b*). Without wishing to be bound by theory, tension in the mounting bolts clamps the door 20 between the mounting bracket 201 and back face of the exterior portion of the lock 100, as shown in FIG. 1*b*.

The Inventors have found that if the lock chassis of prior locks were grasped (by hand or with a tool) and rotated, it might be possible to cause the shaft of the lock to rotate as well, which would then cause the deadbolt to retract. Therefore, it would be beneficial to include features that limit or prevent rotation of the chassis. In one embodiment, anti-rotation arm 102 is formed on the chassis and is an extension of the chassis in the illustrated embodiment. The anti-rotation arm enters the door bore and sits against the bottom of the deadbolt assembly. If rotation of the lock is attempted, the anti-rotation arm abuts against the bottom of the deadbolt assembly and as such the chassis is restricted from any further rotation. That is, the deadbolt assembly acts as a stop against the anti-rotation arm and thus the deadbolt assembly limits or prevents rotation of the lock mechanism about the axis of the door bore hole.

FIG. 2 shows an exploded perspective view of the exterior portion 100 of the lock. Chassis 101 provides the structural support for the exterior portion of the lock. The anti-rotation arm 102 is formed integral with the chassis in the illustrated embodiment, although other embodiments are possible including embodiments where the anti-rotation arm is a separate piece fastened to the chassis. The chassis is disposed between a baseplate 131 and a cover 132 (which also may be referred to as an escutcheon). An electronic assembly 130 fits within the chassis. Buttons 141 are accessible through the cover. Bore hole guide 311 fills the space in the bore hole around the anti-rotation arm, deadbolt mechanism, and mounting bolts in certain applications. The inventors have recognized that different door bore hole sizes are standard in different markets. For instance, the standard door bore hole size is larger in the US than it is in Canada. The bore hole guide may be used to allow a single lock assembly to accommodate a range of door bore sizes. The lock chassis and anti-rotation arm are designed to fit the smallest bore hole in a target market and the bore hole guide is designed to allow the lock assembly to also fit a larger door bore hole standard that may exist in another target market. The lock assembly must be installed without the bore hole guide in applications that use the smaller diameter door bore holes.

FIGS. 3*a* and 3*b* show the chassis 101. In the embodiment shown, the chassis is vertically elongated with half circular ends, although the shape is not limiting and other embodiments are contemplated. The outward facing side of the chassis, FIG. 3*a*, is generally hollow with a plurality of strengthening ribs 110 that run in the horizontal and vertical directions. Other embodiments may have more or fewer ribs, including embodiments with no ribs, as well as ribs that run in orientations other than horizontal or vertical. Ribs may connect to the sides of the chassis as well as to structures within the chassis. The Inventors recognize that rib structures extending to the top of the chassis is helpful to strengthen the lock against attack from a would-be intruder striking downward on the exterior portion of the lock with a hammer or other object. The anti-rotation arm, FIG. 3*b* also provides a load path to transmit force from an impact on the top of the lock through the chassis to the door.

In some embodiments, the chassis is made as a zinc alloy die casting, although other materials and manufacturing techniques may be used. Other embodiments may include aluminum, copper alloys, ferrous alloys, polymers, or polymer matrix composites.

As mentioned, a key cylinder 154 is provided to manually operate the deadbolt from exterior side, see FIG. 2. The key cylinder 154 is mounted within chassis 101. Continuing with FIGS. 3*a* and 3*b*, a key cylinder boss 109 formed in the chassis 101 includes key cylinder bore 104 and slot 105, which engages with a lock pin cover 155 on key cylinder 154 (FIG. 2).

As previously described, the key cylinder of prior locks may be a target for attack by a would-be intruder whereby the attacker would mutilate the key cylinder for the purpose of forcibly withdrawing the key cylinder from the exterior side and thereby defeating the lock. The construction described herein is intended to impede this type of attack. The key cylinder is inserted into bore 104 from the interior facing side of chassis 101 (FIG. 3*b*). The lock pin cover 155 on the key cylinder engages blind slot 105 and end of bore 104 steps down to a smaller diameter shoulder near front surface 109. The slot and shoulder inhibit the key cylinder from being removed through the exterior side of the chassis. Cylinder retaining screw 111 (FIG. 2) fastens into thread hole 107 to secure the cylinder into the chassis at the interior end. The key face of the key cylinder, being of smaller diameter than the body of the key cylinder, passes through the exterior opening at 109 and extends in front of the chassis so that it is substantially flush with cover 132 on the outside of the assembled lock. As is appreciated by those skilled in the art, the key cylinder may be a conventional pin and tumbler key cylinder mechanism. In some embodiments, the body of the cylinder and tumbler are brass although bronze, stainless steel, or other materials may be used in other embodiments.

A mechanical connection is necessary to communicate motion between the interior and exterior portions of the lock. Shaft 153 extends from the rear of the key cylinder, runs through the door bore and deadbolt assembly and connects the mechanisms within the interior portion 200. The shaft operates the mechanism of the deadbolt assembly such that rotating the shaft about its longitudinal axis retracts or extends the deadbolt (depending on its starting position and the direction of rotation). When the lock cylinder is turned with the key, the shaft rotates along with the cylinder. The shaft actuates the deadbolt and turns the thumbturn on the interior portion of the lock. When the thumbturn is rotated by the user, the shaft also rotates, actuating the deadbolt. As will be explained below, should the lock be operated with the keypad instead of the key override, the controller would receive the keypad code input from the user and then cause the motor to operate and act on the shaft to move the deadbolt accordingly.

Figure 4:
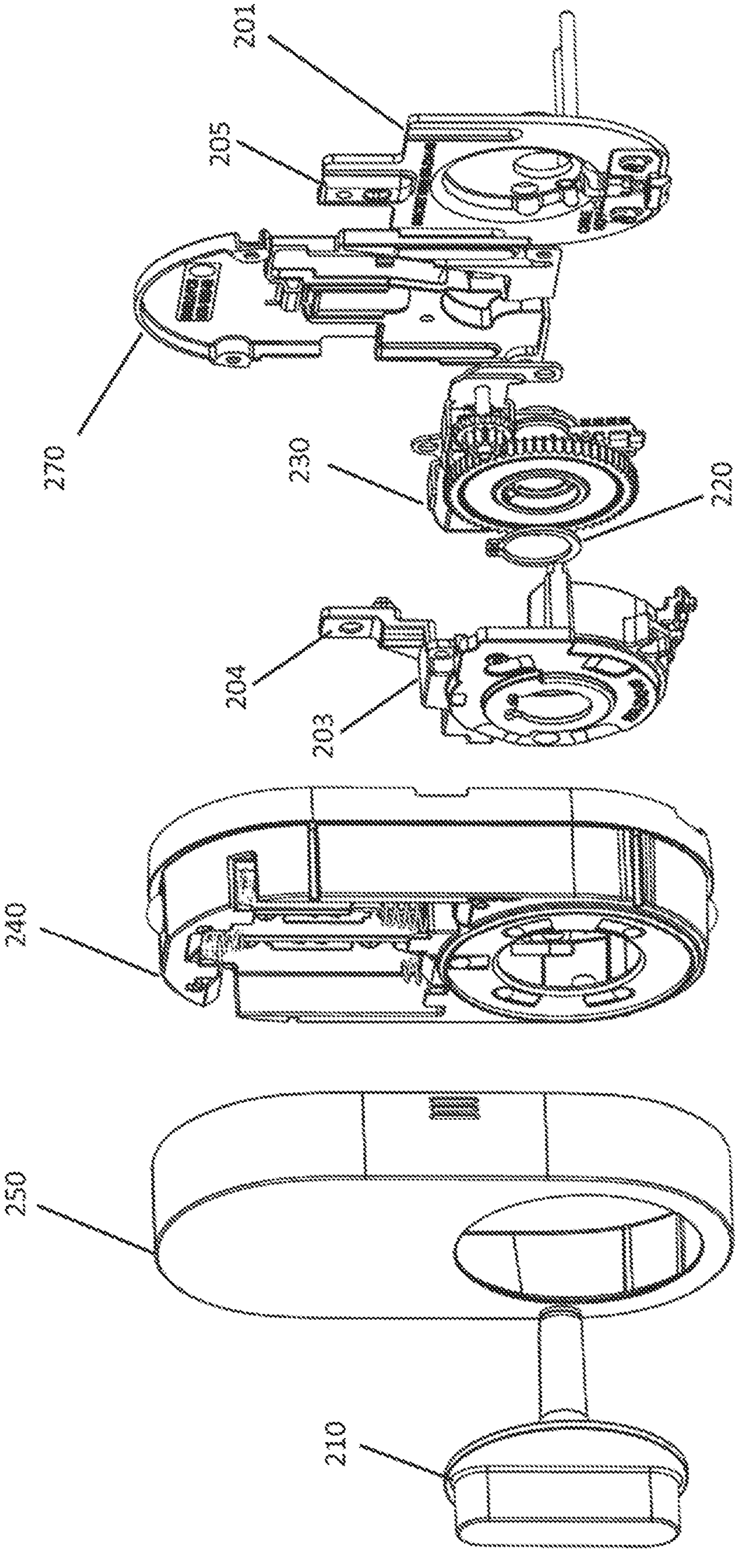
FIG. 4 is an exploded view of the interior portion of the lock assembly of FIG. 1.

FIG. 4 shows an exploded view of the interior portion of the lock. The interior portion of the lock includes a mounting bracket 201, a gearbox 230, a gearbox frame 203, a battery enclosure assembly 240, a cover 250, a thumbturn 210, and a rear shroud 270.

Figure 5A:
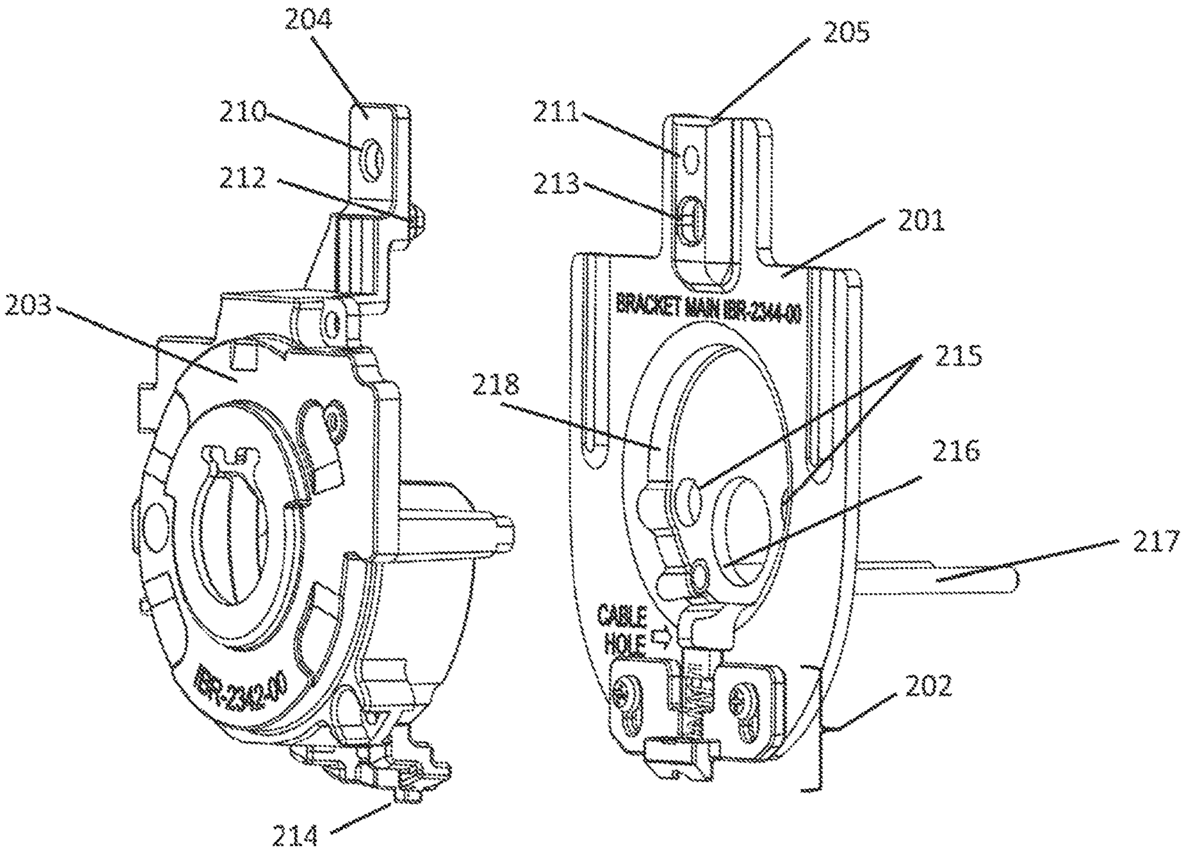
FIG. 5*a* is a perspective view of a gearbox frame and mounting bracket according to one embodiment.

As shown in FIG. 5*a*, mounting bracket 201, sits on the interior surface of the door and is registered in place by the stamped protrusion 218 (see FIG. 1*a*), which partially enters the bore hole in the door. It should be appreciated that the stamped protrusion 218 is shown as a depression in FIG. 5*a*. The mounting bracket 201 is fastened to the external portion of the lock by the mounting bolts which pass through holes 215. Hole 216 provides clearance for shaft 153 to pass through. In the illustrated embodiment, 201 is stamped steel, although other embodiments could utilize different materials and manufacturing processes.

A gearbox frame 203 connects the gearbox 230 (see FIG. 4) to the mounting bracket. In the illustrated embodiment, the gearbox frame is formed of a zinc alloy but other embodiments could use different materials. A raised ear 205 on the top of the mounting bracket contains threaded hole 211 and pin clearance hole 213. Pin 212 on ear 204 of the gearbox frame 203 mates with hole 213 on the mounting bracket and the two are secured with a screw running through hole 210 into threaded hole in 211. A spring-loaded hook assembly 202 on the bottom of the mounting bracket catches latch 214 located on the bottom of the gearbox frame. Thus, the gearbox can be secured to the mounting bracket with only a single screw.

Figure 5B:
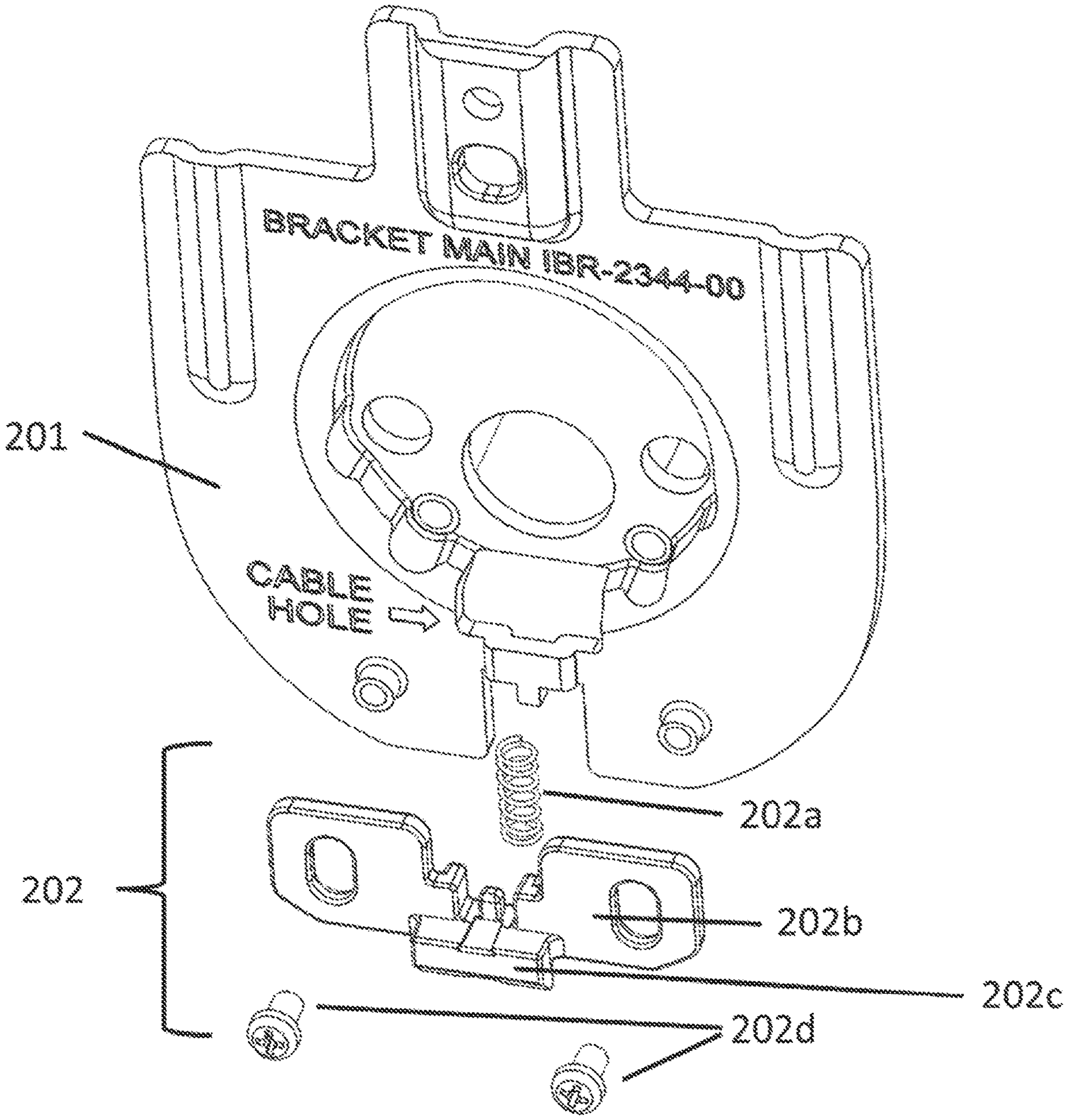
FIG. 5*b* is an exploded view of the mounting bracket of FIG. 5*a;*

FIG. 5*b* shows and exploded view of the spring-loaded hook assembly. Hook frame 202*b* is allowed to slide vertically in the elongated holes, retained by screws 202*d*. Hook frame includes hook 202*c*. The hook frame 202*b* is pushed downward by spring 202*a*. When the hook 202*c* and latch 214 are brought together, the angled surface on hook 202*c* encounters the latch, the hook 202*c* and hook frame 202*b* moves upward until it has moved past the latch and then drops, thereby securing the hook 202*c* and latch 214 connection.

In the described embodiment, the gearbox 230 includes an electric motor and geartrain which turns shaft 153 when an electric signal is received. Electric operation begins when a user enters their code on the exterior keypad 141. A controller within the lock receives the keypad signal. If the controller determines the code is authentic, the controller directs power to the motor. The motor turns a speed reducing geartrain within the gearbox. The final gear in the train engages with shaft 153 such that they rotate together about their common axis. An angular position sensor in the gearbox sends a position signal to the controller which terminates power to the motor when the deadbolt has moved the required distance. Batteries located within the interior portion of the lock provide the power to run the controller and operate the motor. Other embodiments may include other features, such as a card reader to authenticate credentials, wireless or "internet of things" connectivity, or other methods of receiving credentials. The controller authenticating the credentials need not be within the lock, the lock may communicate with such a controller by wired or wireless signals including signals transmitted through the internet. The controller may be programmed to receive automated signals (such as to lock in the event of a crime alert or open in the event of a fire) or sensor inputs or to perform a programmed operation at a specific time. The controller may be programmed to freeze for a certain period of time if a number of incorrect codes are entered. Different credentials may be assigned to different individuals to monitor use or to provide different levels of access (i.e. between specific times, etc.). Other methods of electro-mechanical actuation which may include solenoids, worm and screw mechanism, eccentric mechanism or other mechanisms. Some embodiments may not include any provision for electric operation.

Figure 6A:
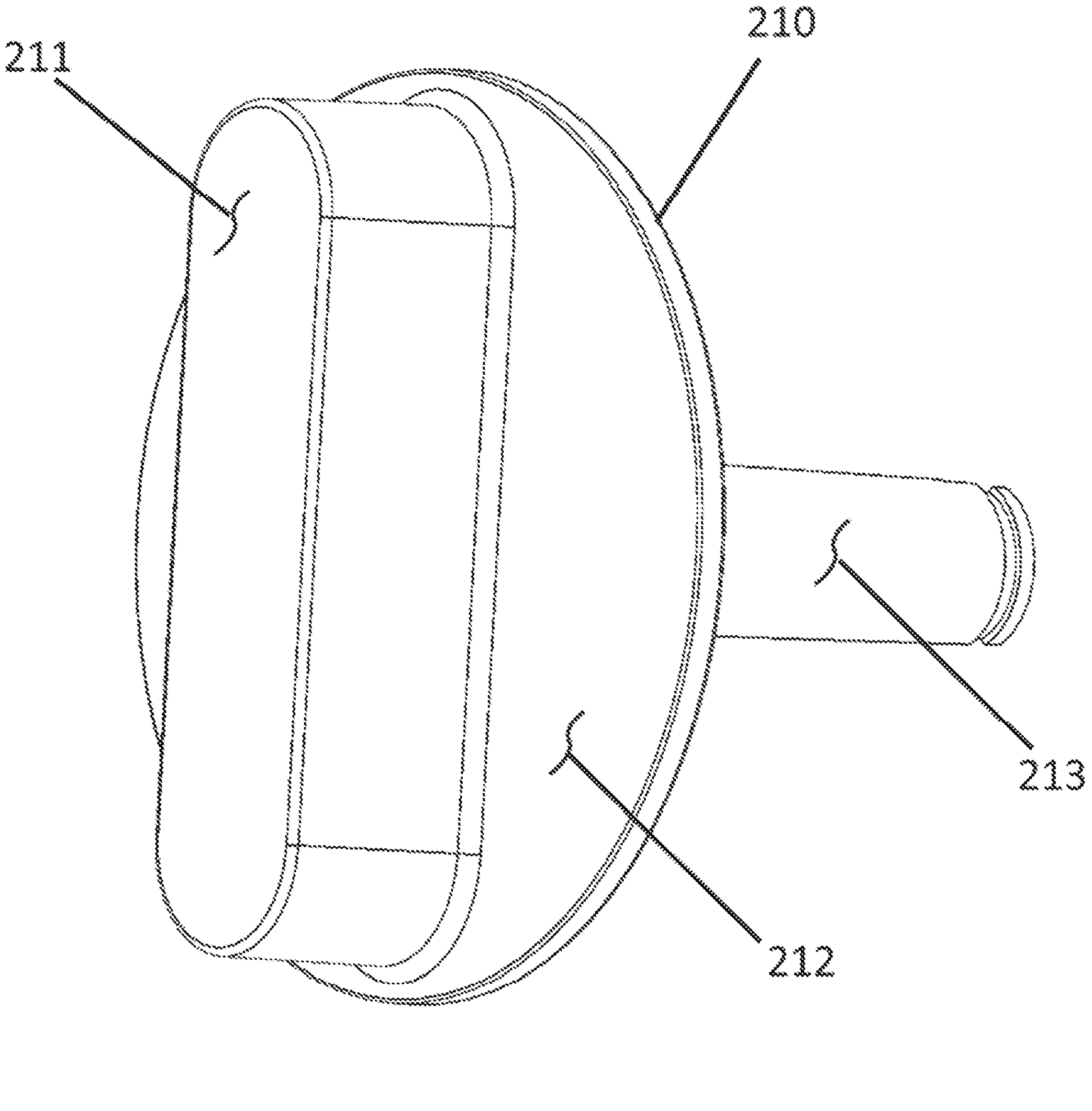
FIG. 6*a* is a front perspective view of a thumbturn of FIG. 4.
Figure 6B:
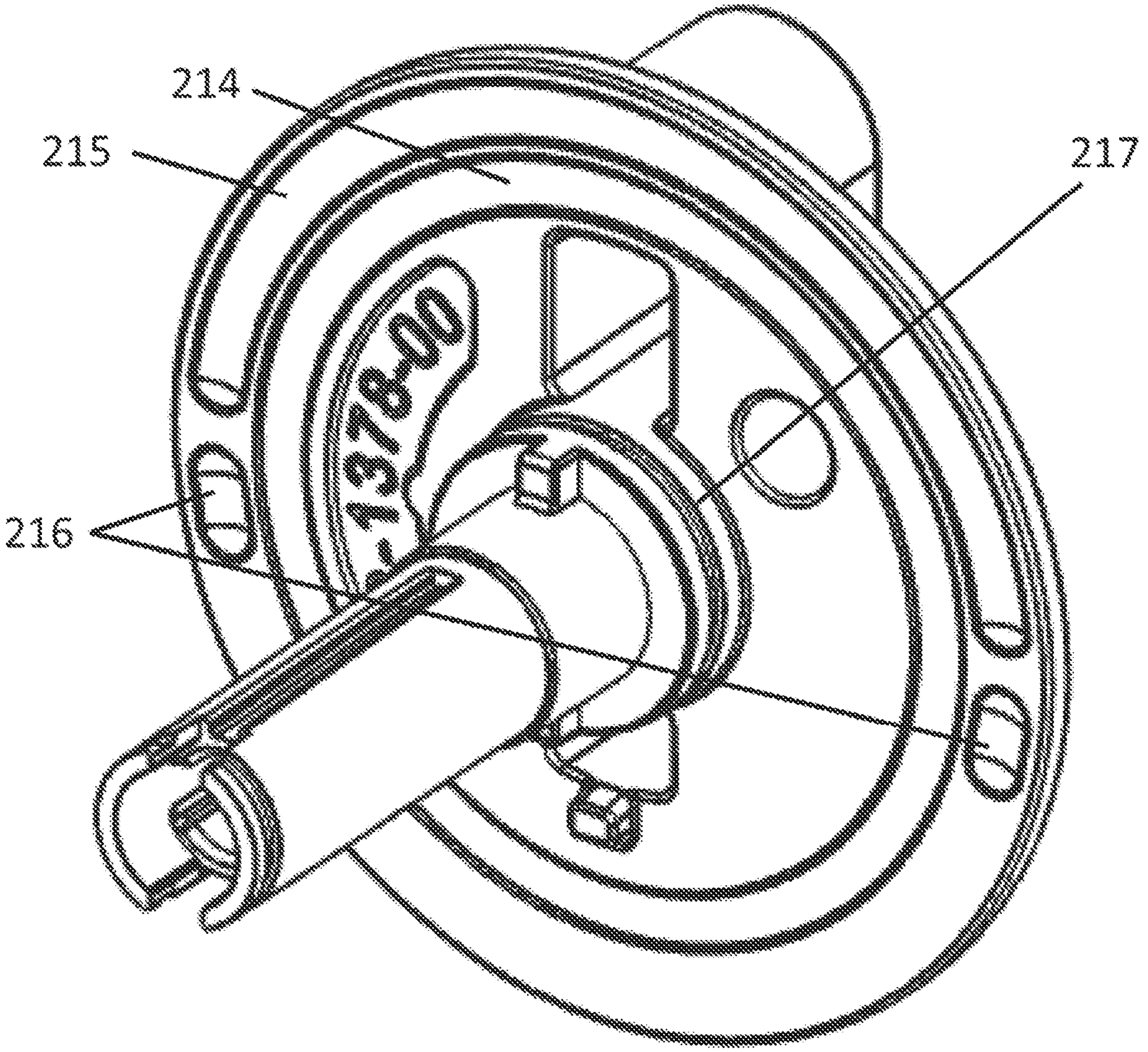
FIG. 6*b* is a rear perspective view of the thumbturn of FIG. 6*a*; and, FIG. 7 is a front view of a battery holder assembly of FIG. 4.

FIGS. 6*a* and 6*b* show the thumbturn 210 as including a handle 211 disposed on a disc 212 with shaft 213 extending from the rear toward the exterior portion of the lock. In the illustrated embodiment, these portions are formed as a single piece but could be separate pieces that are connected together in other embodiments. FIG. 6*b* shows the thumbturn from the side facing the lock. Inner groove 214, which has a semicircular cross-section, is continuous while the outer groove 215, which also has a semicircular cross-section, extends only over approximately the top half of the disk. Detent pockets 216 are formed adjacent each end of the groove 215. Detents act along the above-mentioned grooves to stabilize the thumbturn as will be described below.

Figure 7:
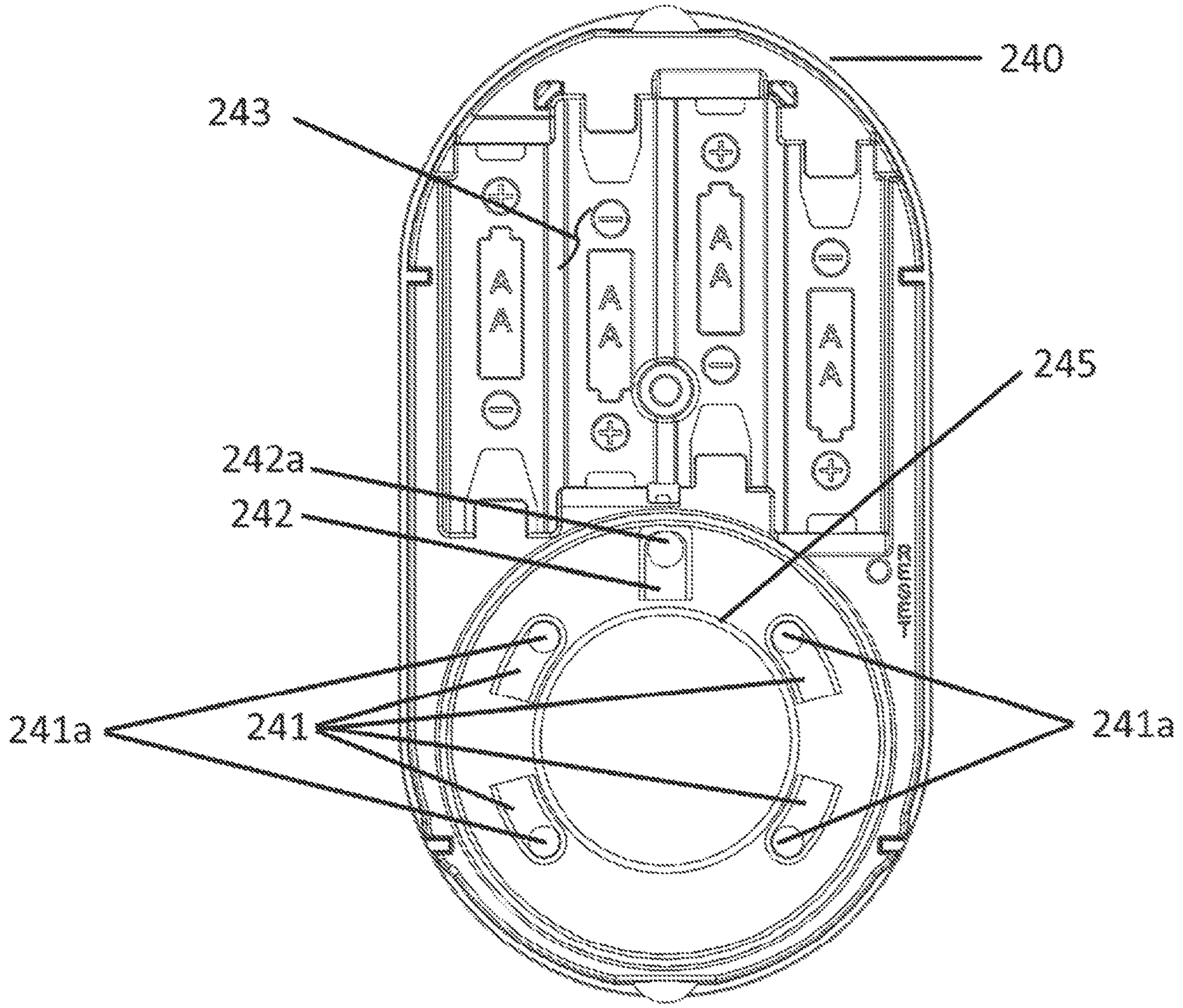

Referring to FIG. 7, the battery holder 240 has a vertically elongated shape with rounded ends. In other embodiments alternate shapes may be used. The battery holder assembly includes the batteries, printed circuit board (PCB), and detents for the thumbturn. It is held to the interior portion of the lock assembly by screws passing through the shroud 270. An aperture 245 for the thumbturn is located approximately concentric to the axis of the lower rounded end. The circular opening is large enough for the thumbturn shaft 213 to pass through but is smaller than the diameter of the thumbturn disc.

Again referring to FIG. 7, the battery holder 240 includes detent arms 241, 242 at locations around the thumbturn aperture. In the embodiment shown, five detents arms are located on the battery holder in the regions surrounding the thumbturn aperture. These include four inner detent arms 241 and one outer detent arm 242. All of the detent arms 241, 242 include hemispherical pads 241*a*, 242*a*, respectively, at their distal ends. These hemispherical pads 241*a*, 242*a* are configured to run in one of either their respective grooves 214 or 215 previously described. In particular, hemispherical pads 241*a* ride along the inside groove 215 on the thumbturn disc and serve to stabilize the thumbturn (reduce "wobble" of the thumbturn). Hemispherical pad 242*a* located at the top of the thumbturn opening rides along the outside grove 215. The hemispherical pad 242*a* engages with detent pockets 216 at certain thumbturn positions. This provides the user tactile feedback to indicate that a desired deadbolt position has been reached. It should be noted that there is no significance to the order of the inner and outer grooves and equivalent functionality would exist if the order were reversed or if features were combined into a single groove. Detents may be described as stop detents or stabilizing detents although both functionalities could be combined into a single detent feature. Other embodiments may have more or fewer detents, and may have more or fewer grooves, the specific number and arrangement not being limiting to the functionality. In some embodiments it may be desirable to have at least three stabilizing detents distributed around the thumbturn aperture with a rotational spacing not greater than approximately 120° between neighboring detents. In other embodiments, the hemispherical pads could be separate pieces including spherical pieces such as ball bearing balls.

The upper portion of the battery holder assembly, 243, holds the batteries that supply power to operate the electrical components of the lock. Batteries are accessed by removing cover 250 (FIG. 4) which snaps in place over the gearbox assembly. Batteries provide electrical power for operating the lock. This includes driving the motor as previously described as well as receiving and processing the codes input onto the keypad by the user.

Where used in the claims, the term "interior" should be interpreted to mean on the side of or toward the secured space. The term "exterior" should be interpreted as on the side of or toward the unsecured space.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Some actions are described as taken by a "user" it should be appreciated that a "user" need not be a single individual and that in some embodiments actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A lock assembly, comprising:

an exterior portion configured to be mounted on an outside of a door;

an interior portion configured to be mounted on an inside of the door, the exterior portion and the interior portion are configured to be fastened to each other; and, a deadbolt assembly configured to be actuated by the exterior and interior portions;

the exterior portion including:

a chassis; and, an anti-rotation arm disposed on the chassis, the anti-rotation arm configured to abut the deadbolt assembly and configured to transfer torque from the chassis to the deadbolt assembly, thereby inhibiting compromising integrity of the lock assembly;

wherein the exterior portion includes a baseplate and a cover, the chassis being disposed between the baseplate and the cover.

2. The lock assembly of claim 1, further comprising a shaft coupled to at least one of the exterior portion and the interior portion and configured to rotate to alternately extend and retract the deadbolt, the anti-rotation arm inhibiting rotation of the chassis that would otherwise cause rotation of shaft.

3. The lock assembly of claim 1, wherein the anti-rotation arm is integrally formed with the chassis.

4. The lock assembly of claim 1, wherein the chassis includes a plurality of strengthening ribs.

5. The lock assembly of claim 1, wherein the exterior portion includes an interface for inputting a user credential; and the interior portion includes:

a motor and gearbox configured to actuate the deadbolt;

a mounting bracket configured to connect to exterior portion; and, a gearbox frame housing the motor and gearbox, the gearbox frame connected to the mounting bracket with a screw and a hook and latch arrangement.

6. The lock assembly of claim 5, wherein the hook and latch arrangement includes a hook, and wherein the hook is coupled to the mounting bracket with a spring.

7. The lock assembly of claim 5, wherein the gearbox frame and the mounting bracket are aligned to each other by an alignment pin that is configured to enter a hole, the pin being disposed on one of the gearbox frame and the mounting bracket and the hole being disposed on the other of the gearbox frame and the mounting bracket.

8. The lock assembly of claim 1, wherein the interior portion includes:

a thumbturn configured to actuate the deadbolt assembly;

a plurality of detents disposed on the interior portion and configured to engage the thumbturn so as to reduce wobble.

9. The lock assembly of claim 8, wherein the plurality of detents engage corresponding detent pockets to provide corresponding rotational stop positions for the thumbturn.

10. The lock assembly of claim 8, wherein the thumbturn comprises at least one stabilizing groove configured to receive the plurality of detents.

11. The lock assembly of claim 2, further comprising a key override arrangement including a key cylinder disposed in the exterior portion and connected to the shaft, wherein actuation of the key override arrangement causes rotation of the shaft to actuate the deadbolt.

12. The lock assembly of claim 11, wherein the key cylinder is mounted within a key cylinder boss formed in the chassis.

13. The lock assembly of claim 1, wherein the anti-rotation arm is further configured to direct vertical loads applied to the chassis to the door.

14. The lock assembly of claim 1, wherein the chassis comprises a zinc alloy.

15. The lock assembly of claim 1, further comprising a keypad disposed on the cover.

16. The lock assembly of claim 1, further comprising an electronic assembly disposed within the chassis.

17. The lock assembly of claim 1, wherein the interior portion includes a mounting bracket for securing the interior portion on the inside of the door, wherein the mounting bracket is securable to the chassis.

18. The lock assembly of claim 17, wherein the mounting bracket is securable to the chassis by mounting bolts fastened into blind threaded holes in the chassis.

19. The lock assembly of claim 18, wherein the mounting bolts extend through holes in the deadbolt assembly.

20. A lock assembly, comprising:

an exterior portion configured to be mounted on an outside of a door;

an interior portion configured to be mounted on an inside of the door, the exterior portion and the interior portion are configured to be fastened to each other; and, a deadbolt assembly configured to be actuated by the exterior and interior portions;

the exterior portion including:

a chassis; and, an anti-rotation arm disposed on the chassis, the anti-rotation arm configured to abut the deadbolt assembly and configured to transfer torque from the chassis to the deadbolt assembly, thereby inhibiting compromising integrity of the lock assembly;

wherein the chassis further comprises a cylindrical boss extending from a rear side of the exterior portion and sized to be received in a door bore hole having a first size, with the anti-rotation arm extending rearward from the cylindrical boss.

21. The lock assembly of claim 20, further comprising a bore hole guide detachably connectable with the rear side of the exterior portion, surrounding the cylindrical boss, and sized to be received in a second door bore hole having a second size larger than the first size.

22. A lock assembly, comprising:

an exterior portion configured to be mounted on an outside of a door;

an interior portion configured to be mounted on an inside of the door, the exterior portion and the interior portion are configured to be fastened to each other; and, a deadbolt assembly configured to be actuated by the exterior and interior portions;

the exterior portion including:

a chassis; and, an anti-rotation arm disposed on the chassis, the anti-rotation arm configured to abut the deadbolt assembly and configured to transfer torque from the chassis to the deadbolt assembly, thereby inhibiting compromising integrity of the lock assembly;

wherein the chassis further comprises an extension extending from a rear side of the exterior portion and sized to be received in a first door bore hole having a first size, with the anti-rotation arm extending rearward from the extension;

wherein the lock assembly further comprises a bore hole guide detachably connectable with the rear side of the exterior portion, surrounding the extension, and sized to be received in a second door bore hole having a second size larger than the first size.

23. The lock assembly of claim 22, wherein the exterior portion includes a baseplate and a cover, the bore hole guide being detachably connectable with the baseplate.

* * * * *